United States Patent
Kamimura (10) Patent No.: US 7,697,065 B2
(45) Date of Patent: Apr. 13, 2010

(54) PIXEL CONVERSION DEVICE AND PIXEL CONVERSION METHOD

(75) Inventor: Shigeki Kamimura, Tsurugashima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/273,404

(22) Filed: Nov. 18, 2008

(65) Prior Publication Data

US 2009/0244366 A1 Oct. 1, 2009

(30) Foreign Application Priority Data

Mar. 26, 2008 (JP) ............... 2008-081020

(51) Int. Cl.
*H04N 11/20* (2006.01)
(52) U.S. Cl. .................... 348/453; 348/441
(58) Field of Classification Search ............. 348/453, 348/441, 443, 444, 446, 448, 450, 458, 459, 348/672; 382/168–172; *H04N 7/01, 11/20*
See application file for complete search history.

(56) References Cited

U.S. PATENT DOCUMENTS

| | | | |
|---|---|---|---|
| 6,608,926 | B1 | 8/2003 | Suwa et al. |
| 7,057,664 | B2 * | 6/2006 | Law et al. ............ 348/448 |
| 7,203,357 | B2 | 4/2007 | Teratani et al. |
| 7,280,155 | B2 * | 10/2007 | Law et al. ............ 348/448 |

FOREIGN PATENT DOCUMENTS

| | | |
|---|---|---|
| JP | 11-262031 | 9/1999 |
| JP | 11-284860 | 10/1999 |
| JP | 2002-135584 | 5/2002 |
| JP | 2003-250057 | 9/2003 |
| JP | 2004-304635 | 10/2004 |

OTHER PUBLICATIONS

Japanese Patent Application No. 2008-081020 Notice of Reasons for Rejection mailed Mar. 24, 2009 (English Translation).

* cited by examiner

*Primary Examiner*—Sherrie Hsia
(74) *Attorney, Agent, or Firm*—Blakely Sokoloff Taylor & Zafman, LLP (57) ABSTRACT

According to one embodiment, an embodiment of a pixel conversion device of the invention improves outlines of edge peripheries of characters, etc., of a color digital image signal. The device includes a histogram extraction module, a picture characteristic extraction module which detects a luminance boundary in a luminance signal block on the basis of histogram information, sets a color-difference boundary of the same pattern as that of the luminance boundary to a virtual color-difference signal block, and generates a control signal for unifying the same area by pixel data of the same value, and a data rate conversion module which converts a color-difference signal block before conversion into the same data rate as that of the luminance signal block to correlate the converted color-difference signal block to the virtual color-difference signal block, corrects resolution and obtains a color-difference signal for a format of 4:4:4.

4 Claims, 9 Drawing Sheets

FIG. 1

| 64 | 64 | 64 | 192 | 192 | 192 |
|----|----|----|-----|-----|-----|
| 64 | 64 | 192 | 192 | 192 | 192 |
| 64 | 64 | 64 | 192 | 192 | 192 |
| 64 | 64 | 64 | 64 | 64 | 192 |

FIG. 2A

| 128 | 200 | 255 |
|-----|-----|-----|
| 128 | 150 | 200 |

FIG. 2B (Luminance)

| 64 | 64 | 64 | 192 | 192 | 192 |
| 64 | 64 | 192 | 192 | 192 | 192 |
| 64 | 64 | 64 | 192 | 192 | 192 |
| 64 | 64 | 64 | 64 | 64 | 192 |

111

FIG. 3A (Color difference)

| 128 | 128 | 128 | 255 | 255 | 255 |
| 128 | 128 | 255 | 255 | 255 | 255 |
| 128 | 128 | 128 | 255 | 255 | 255 |
| 128 | 128 | 128 | 128 | 128 | 255 |

(Luminance)

| 64 | 64 | 64  | 192 | 192 | 192 |
|----|----|-----|-----|-----|-----|
| 64 | 64 | 192 | 192 | 192 | 192 |
| 64 | 64 | 64  | 192 | 192 | 192 |
| 64 | 64 | 64  | 64  | 64  | 192 |

111

FIG. 5A (Color difference)

| A | A | A | B | B | B |
| A$^{128}$ | A | B$^{200}$ | B | B$^{255}$ | B |
| A | A | A | B | B | B |
| A$^{128}$ | A | A$^{150}$ | A | A$^{200}$ | B |

(Luminance)

| 64 | 64 | 64 | 192 | 192 | 192 |
| 64 | 64 | 64 | 64 | 192 | 192 |
| 128 | 128 | 128 | 64 | 192 | 192 |
| 128 | 128 | 128 | 64 | 64 | 192 |

Decide boundary

| 64 | 64 | 64 | 192 | 192 | 192 |
|---|---|---|---|---|---|
| 64 | 64 | 192 | 192 | 192 | 192 |
| 64 | 64 | 64 | 192 | 192 | 192 |
| 64 | 64 | 64 | 64 | 64 | 192 |

Decide area, in which pixel values to be employed in each area, exist

Decide pixel value to be employed

| A 128 | A 128 | A 200 | B 200 | B 255 | B 255 |
|---|---|---|---|---|---|
| A 128 | A 128 | B 200 | B 200 | B 255 | B 255 |
| A 128 | A 128 | A 150 | B 150 | B 200 | B 200 |
| A 128 | A 128 | A 150 | A 150 | A 200 | B 200 |

Perform replacement processing to each area by a pixel value to be employed therein

| A 128 | A 128 | A 128 | B 255 | B 255 | B 255 |
|---|---|---|---|---|---|
| A 128 | A 128 | B 255 | B 255 | B 255 | B 255 |
| A 128 | A 128 | A 128 | B 255 | B 255 | B 255 |
| A 128 | A 128 | A 128 | A 128 | A 128 | B 255 |

PIXEL CONVERSION DEVICE AND PIXEL CONVERSION METHOD

CROSS-REFERENCE TO RELATED APPLICATIONS

This application is based upon and claims the benefit of priority from Japanese Patent Application No. 2008-081020, filed Mar. 26, 2008, the entire contents of which are incorporated herein by reference.

BACKGROUND

1. Field

One embodiment of the invention relates to a pixel conversion device and a pixel conversion method, and the invention is effective to reduce color smears of characters, for example.

2. Description of the Related Art

In a terrestrial digital broadcast, a digital image signal including a digital luminance signal and a digital color-difference signal is transmitted in a format of 4:2:0. In recent years, the resolution of a digital television device has improved, so that opportunities to transmit a digital image signal including many characters through a digital broadcast have increased.

Therefore, in the digital television device, it has been desired to apply image-quality improving processing to the image signal including the characters. As regards a device for applying the image-quality improving processing, various techniques have been developed. For instance, patent document 1 (Jpn. Pat. Appln. KOKAI Publication No. 2004-304635) has disclosed a technique which creates a histogram of a luminance signal to set a background level for an object pixel. This technique applies prescribed image processing on the basis of the prescribed background level to improve contrast between the characters or the like and the background.

In patent document 1, as regards the luminance signal, the contrast between the characters and the background is good and the image quality of the image including the characters is improved. However, the digital image signal consisting of the luminance signal and the color-difference signal produces a problem that color smears occur at the peripheries of the characters. More specifically, if colored characters exist on a colored background, there is some possibility that the characters become vaguely-outlined.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

According to one embodiment of the invention, an object of the invention is to provide an image conversion device and its conversion method configured to improve outlines of edge peripheries of characters, etc., in a color digital image signal including fine edges of characters, etc.

According to one embodiment of the embodiment, to solve the aforementioned problem, a pixel conversion device, which converts a first digital image signal, in a format of 4:2:0, including a digital luminance signal and a digital color-difference signal before conversion into a second digital image signal in a format of 4:4:4 including digital luminance signal and a digital color-difference signal after conversion, comprises a histogram extraction module which detects a histogram in a luminance signal block, one of the luminance signal block being defined as a module for processing; a picture characteristic extraction module which detects a luminance boundary in the luminance signal block on the basis of information on the detected histogram, sets a color-difference boundary of the same pattern as that of the luminance boundary to a virtual color-difference signal block of the same data rate as that of the luminance signal block to divide the virtual color-difference signal block into each area, and generates a control signal for unifying the same area by pixel data of the same value; and a data rate conversion module which converts a color-difference signal block of the digital color-difference signal before conversion into the same data rate as that of the luminance signal block to correlate the converted color-difference signal block to the virtual color-difference signal block, corrects resolution on the basis of the control signal from the picture characteristic extraction module and obtains a color-difference signal for the format of 4:4:4.

According to the above means, since the color-difference signal for the format of 4:2:0 is converted into the format of 4:4:4 corresponding to resolution of a luminance signal, resolution of a color signal may be improved and the fine edges of the characters, etc., may be greatly improved.

Figure 1:
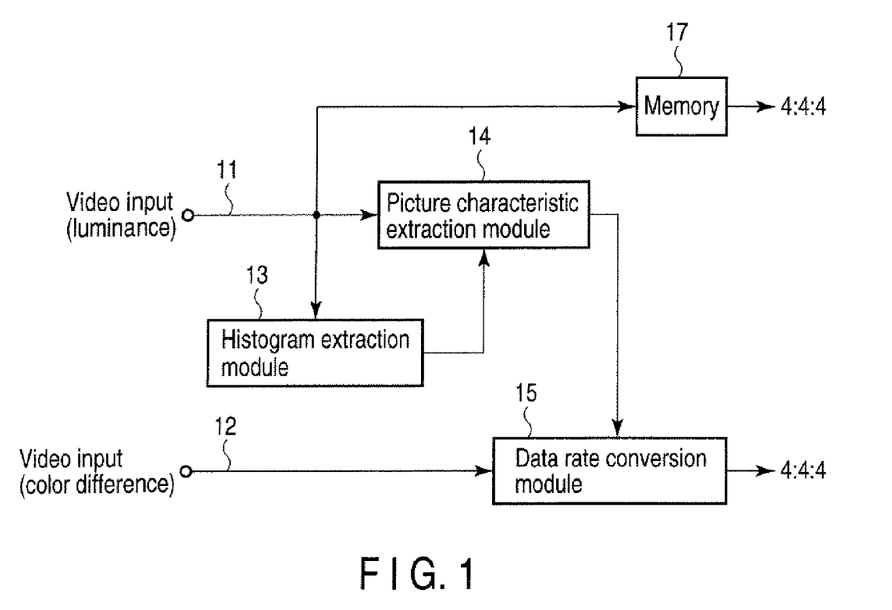
FIG. 1 is a view depicting a basic configuration of a pixel conversion device of the invention.

The following will describe embodiments of the invention in detail with reference to the drawings. In FIG. 1, a digital luminance signal before conversion which has been separated from the digital image signal in the format of 4:4:4 is input to an input terminal 11, and in the same way, a digital color-difference signal before conversion which has been separated from the digital image signal in the format of 4:4:4 is input to an input terminal 12. The digital color-difference signal is input to a data rate conversion module 15 to be subjected to rate conversion, to be subjected to resolution conversion, or to only rate conversion, and to be output without the resolution conversion. Thereby, an output from the data rate conversion module 15 is output as the color-difference signal for the format of 4:4:4.

The digital luminance signal before conversion is input to a histogram extraction module 13 and a picture characteristic extraction module 14. The extraction module 13 extracts a histogram for each luminance signal block, one of the luminance signal block is defined as a unit for processing. Histogram information which has been detected and acquired by the histogram extraction module 13 is utilized in order to determine a luminance boundary by dividing areas differing in luminance level in the luminance signal block, that is, areas differing in pixel values. The characteristic extraction module 14 generates luminance boundary information to generate a control signal for the conversion module 15 by using the boundary information. The control signal will be described later.

The conversion module 15 applies rate conversion at double speed to the pixel of the color-difference signal so that the number of samplings of the pixels of the color-difference signal becomes the same number of samplings of the pixels of the luminance signal. The conversion module 15 operates so as to match the resolution of the luminance signal and the color-difference signal.

The conversion module 15 will be described in detail later; however, the conversion module 15 converts the color-difference signal block of the digital color-difference signal before conversion into the same rate as that of the luminance signal block on the basis of the control signal from the picture characteristic extraction module 14 to correct the resolution on the basis of the control signal from the extraction module 14, and obtains the color-difference signal for the format of 4:4:4.

In the foregoing pixel conversion device, an operation principle for converting the first digital image signal in the format of 4:2:0 including the digital luminance signal and digital color-difference signal before conversion into the second digital image signal in the format of 4:4:4 including the digital luminance signal and digital color-difference signal after conversion will be described below.

Figure 2A:
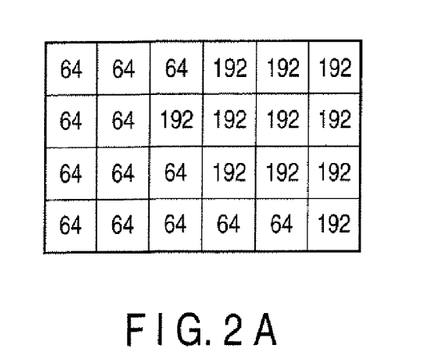
FIGS. 2A and 2B are respective explanation views of a luminance signal block and color-difference signal blocks.
Figure 2B:
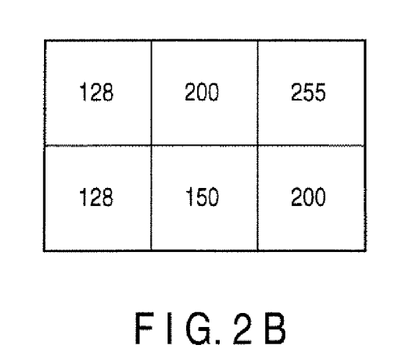

It is assumed that the digital luminance signal of the luminance signal block as is shown in FIG. 2A is input to the input terminal 11, and the digital color-difference signal of the color-deference signal block as is shown in FIG. 2B is input to the input terminal 12. It is further assumed that there are correspondence relationships between the luminance signal block of FIG. 2A and the color-difference signal block of FIG. 2B. FIG. 2A shows the luminance signal block of (4×6) pixels and indicates a value of each luminance signal pixel. FIG. 2B shows the colors difference block of ([4×6]/2) pixels and indicates a value of each color-difference signal pixel.

As described above, in the digital image signal of the format of 4:2:0, information amount of the color-difference signal is set to ¼ compare with that of the luminance signal. This setting was arrived at based on an experimentation rule that even though the band of the color-difference signal is made low, an impression of blurring is not visually perceived. The sizes of the luminance signal block and the colors difference block of the above are examples, and as regards a processing unit, the block may have a different size.

The format of 4:2:0 of the above does not pose any problem in an image, such as a nature scene, originally having a low band of color-difference signal. However, when a color image includes many characters, phenomenon that blur or smear on the colored characters can be seen. Therefore, the conversion device of the embodiment targets an increase in the data rate (or set resolution as that of the luminance signal) of the color-difference signal, and to make clear the edges of the colors.

Figure 3A:
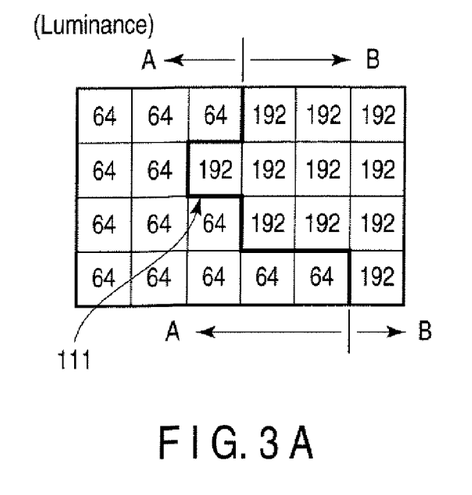
FIGS. 3A and 3B are respective explanation views of a luminance boundary line of a luminance signal block and a color-difference boundary line of a virtual color-difference signal block.

To achieve the aims, it is assumed, for example, that the luminance signal block and the color-difference signal block as are respectively shown in FIGS. 2A and 2B, have been originally formed as the luminance signal block and the color-difference signal block as are respectively shown in FIGS. 3A and 38. That is, as regards the luminance signal, a luminance boundary line ill between the pixels differing in value from each other is found. Thereby, the luminance signal block may be divided, for example, into an area A and an area B. As regards the color-difference block, it is assumed that a color-difference boundary line 112 exists at a position corresponding to the luminance boundary line 111. Thereby, the color-difference signal block may be also divided into an area A and an area B.

Figure 3B:
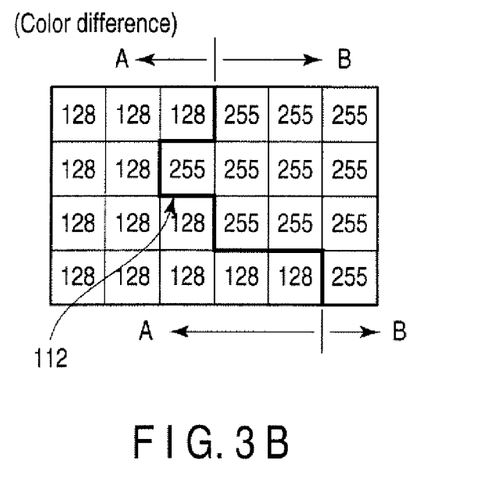

However, the actual color-difference block before conversion is not the rate and the resolution as that of shown in FIG. 3B. Therefore, the color-difference signal block in a stage in which the color-difference boundary line 112 has been set is referred to as the virtual color-difference signal blocks so as to identify the real color-difference block. That is, the color-difference signal blocks to be quoted for generating the control signal by the picture characteristic extraction module 14 are referred to as the virtual color-difference blocks.

As regards an actual color-difference signal block, since the rates and the resolution are ½ of that of the luminance signal block as given above, there are insufficient pixels. Therefore, the actual color-difference block is converted into the same rate of the virtual color-difference signal block (the same rate of the luminance signal block). The color-difference signal block sets the color-difference boundary line 112 to divide for each area, and performs processing so as to unify the same area by the pixel data of the same value. Thus, the color-difference signal in the format of 4:4:4 can be obtained.

The following will describe a method for finding the luminance boundary line 111 in relation to the luminance signal. The luminance signal has been input to the histogram extraction module 13.

Figure 4:
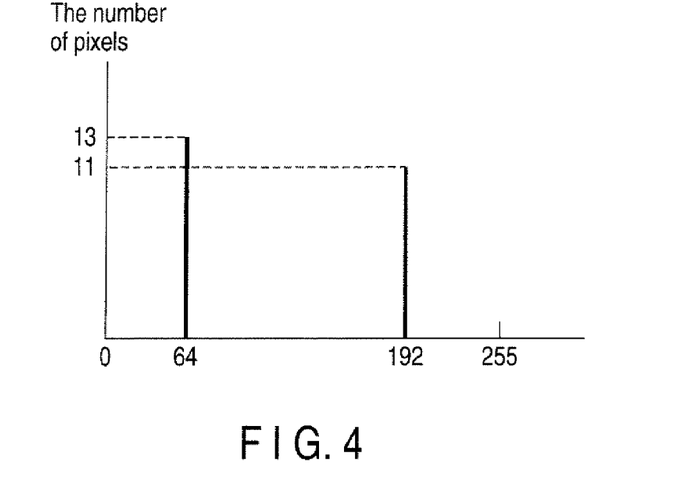
FIG. 4 is a view depicting an example of a histogram when the luminance signal block has been processed.

If it is assumed that the luminance signal block is the block including pixels of value 64 and pixels of value 192 as is shown in FIG. 3A, the histogram extraction module 13 can obtain a histogram as is shown, for example, in FIG. 4.

Figure 5A:
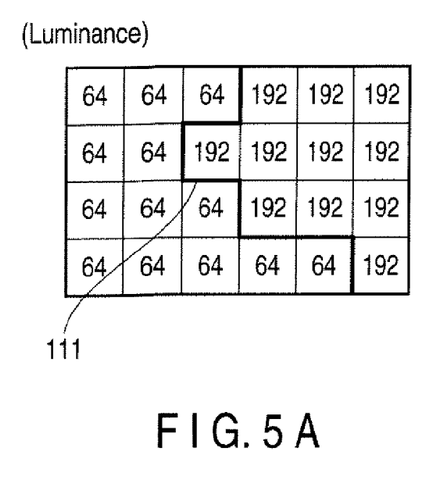
FIGS. 5A and 5B are further respective explanation views of a luminance boundary line of a luminance signal block and color-difference boundary line of a virtual color-difference signal block.
Figure 5B:
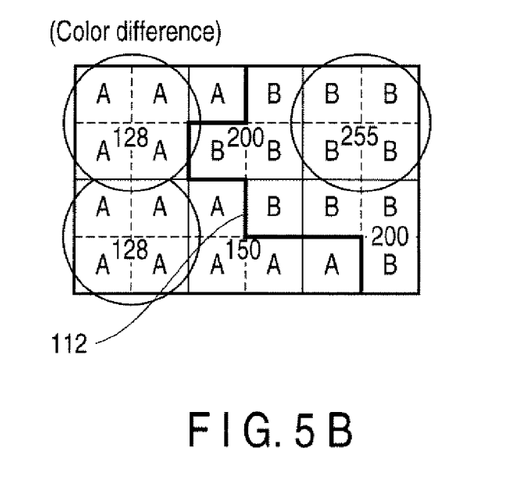

That is, as shown in FIG. 4, the histogram is one of which the number of pixels of value 64 is 13, and of which the number of pixels of value 192 is 11. When a histogram having a large value and a small number of peaks has been obtained, the luminance signal block may predict the boundary of the character. In other words, the boundary between the value 64 and the value 19 is predicted as the boundary of the character. FIG. 5A shows a luminance signal block in which the boundary line 111 has been found on the basis of the histogram of the above and determines that the boundary line 111 is a character boundary. FIG. 5B shows an aspect which applies the color-difference boundary line 112 having the same shape as that of the luminance boundary line 111 to the actual color-difference signal block and sets the area A and the area B in the color-difference signal block. One pixel of the actual color-difference block is overlapped to four pixels of the luminance signal block.

In a case of the color-difference signal block shown in FIG. 5B, it may be assumed that all the notable pixels existing in the area A have a background color of the value 128, and all the notable pixels existing in the area B have a character color of the value 255. Therefore, in this case, unifying all the pixels in the area B to the value 255, and integrating all the pixels in the area A to the value 128 enables making the boundary line 112 (i.e., character edge) between the background color and the colored character clear.

To make the boundary line 112 clear, the picture characteristic extraction module 14 detects the luminance boundary line 111 in the luminance signal block, and control the data rate converter 15 to generate the virtual color-difference signal block of the same rate as that of the luminance signal block. Next, the extraction module 14 sets the color-difference boundary line 112 having the same pattern as that of the luminance boundary line 111 to the virtual color-difference signal block to divide the virtual color-difference signal block for each area. The same area then generates a control signal in order to unify the same area by the pieces of pixel data of the same values.

Figure 6:
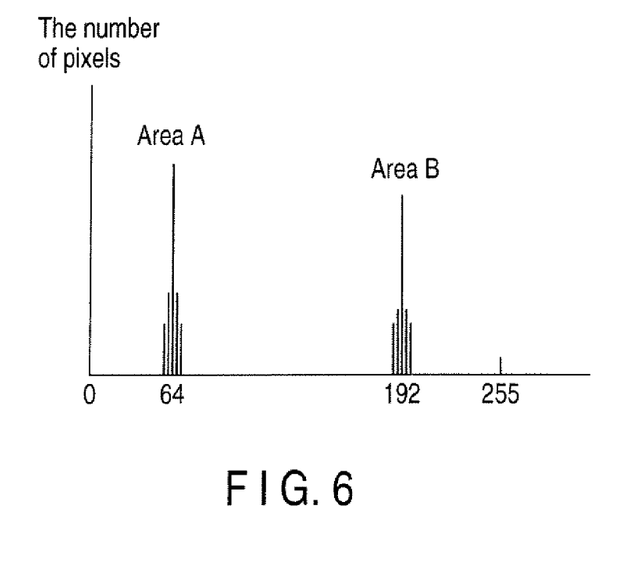
FIG. 6 is a view depicting an example of another histogram when the luminance signal block has been processed.

Actually, a histogram shown in FIG. 6 is obtained herein. FIG. 4 shows an ideal histogram. That is, in a case in which, for instance, a luminance signal block shown in FIG. 3A or FIG. 5A has been processed, a histogram may not be obtained, such that histogram indicates that the pixels of the value 64, the pixels exist 13, and the pixels of the value 192, the pixels exist 11. Actually, the histogram has a margin of error (±1-2LSB). Therefor, as is shown in FIG. 6, a histogram, having a pixel distribution with a peak value 63 as a center, and a pixel distribution with a peak value 192 as a center is obtained.

Figure 7A:
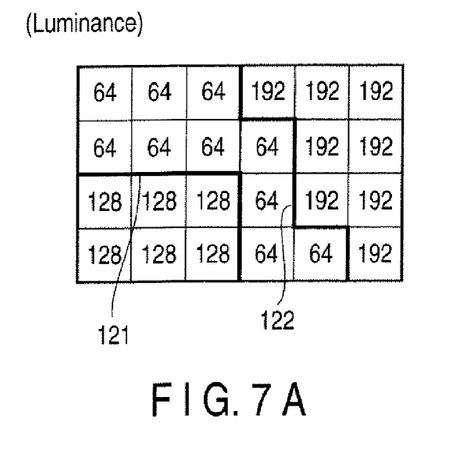
FIGS. 7A and 7B are further respective explanation views of a luminance boundary line of a luminance signal block and a color-difference boundary line of a virtual color-difference signal block.
Figure 7B:
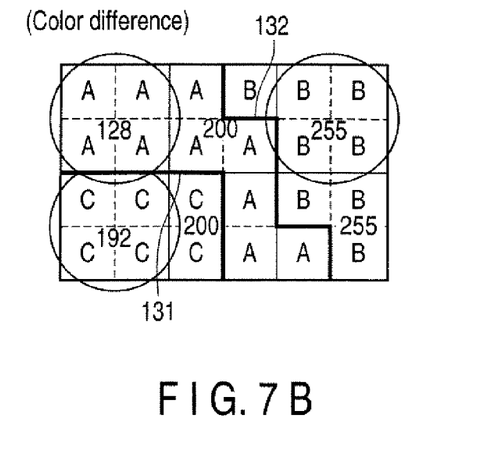
Figure 8:
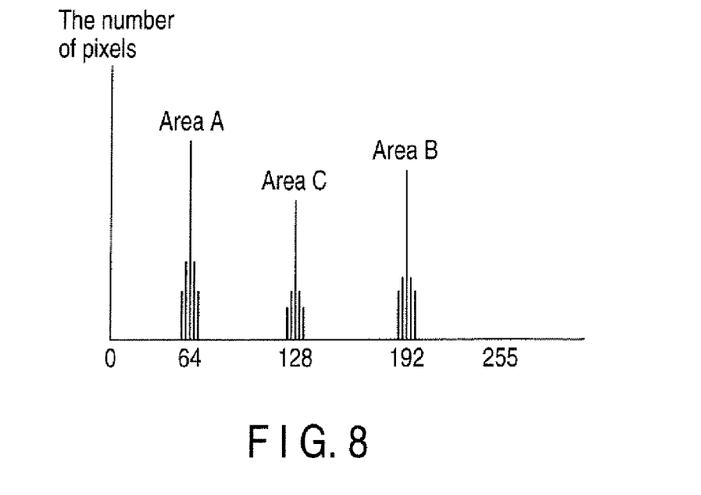
FIG. 8 is a view depicting an example of a histogram when the luminance signal block of FIG. 7A has been processed.

The example of the above indicates the luminance boundary line 111 in the luminance signal block and the color-difference boundary line 112 in the virtual color-difference signal block, which is a case of existence of one boundary line in each of the luminance signal block and the virtual color-difference signal block. However, the invention is not limited to the forgoing example; for example, there is a case in which the luminance boundary lines 121, 122 exist in the luminance signal block as shown in FIG. 7A. In such a case, the corresponding-color-difference boundary lines 131, 132 are set in the virtual color-difference signal block. In a case of a digital image signal having this kind of luminance signal block and color-difference signal block, such a histogram shown in FIG. 8 is obtained. The histogram of FIG. 8 has an area A with a peak 64, an area C with a peak 128, and an area B with a peak 192. In this case, even in the virtual color-difference signal block, for example, areas A, B, C are set. The values of pixels in the identical area are converted into identical values. Thereby, the boundary line (i.e., character edge) between the background and the colored character can be made clear. Although pixels of different values exist in the same area A or area B, in this case, if all the values, depending on a majority decision, or four pixels of (2×2) pixels as an examination unit, are the same, the pixel values in this examination unit are employed. Therefore, in a case of FIG. 7B, the value 128 is selected as a value of each pixel in the area A, the value 255 is selected as a value of each pixel in the area B, and the value 192 is selected as a value of each pixel in the area C.

Figure 9:
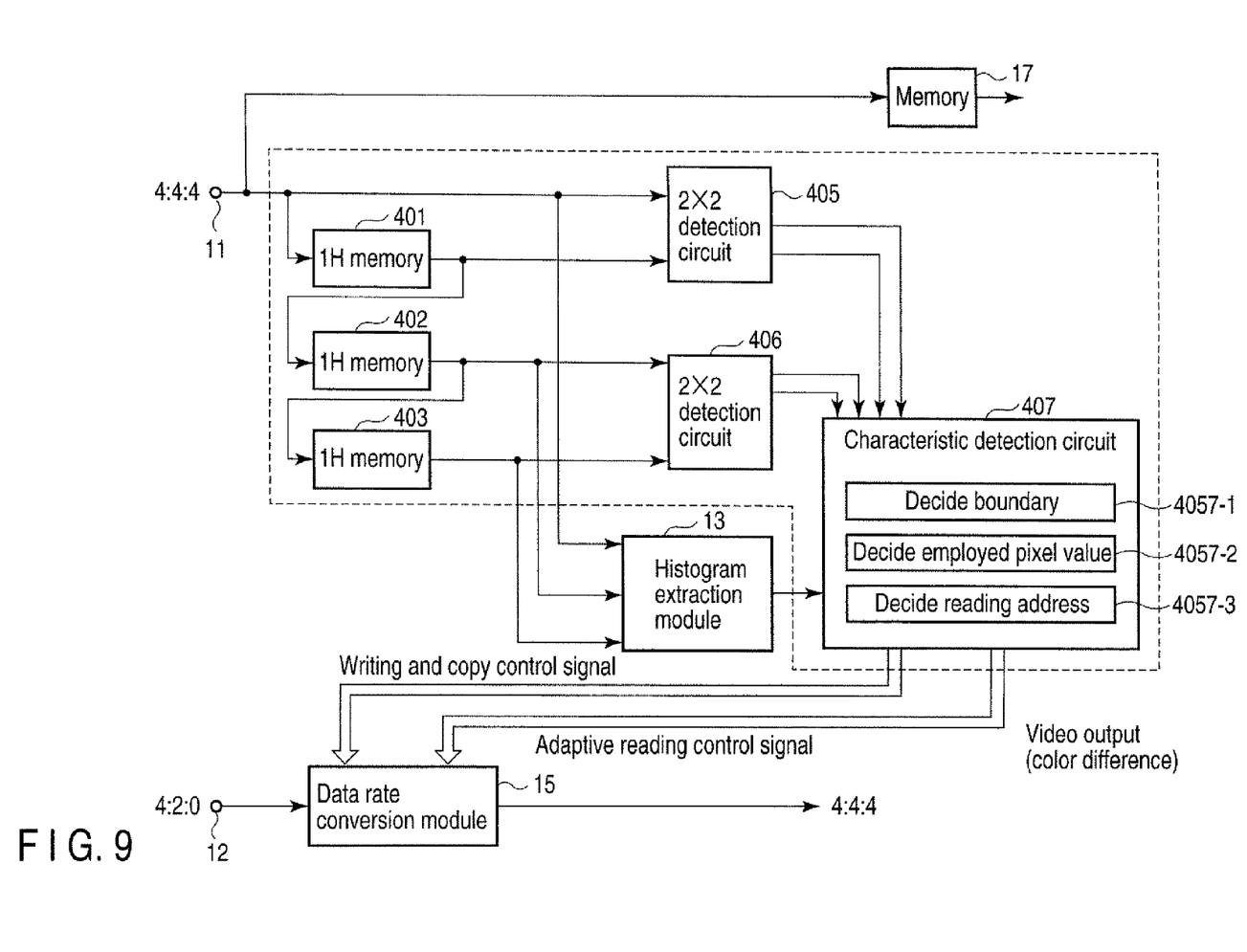
FIG. 9 is a view depicting further concrete configuration example of the conversion device of FIG. 1.

FIG. 9 shows a further concrete configuration of the blocks in FIG. 1. The input terminal 11 is connected to a 1H memory 401 having a display amount of one horizontal period. An output from the 1H memory 401 is connected to an input terminal of a 1H memory 402, and the output from the 1H memory 402 is connected to an input terminal of 1H memory 403. A (2×2) detection circuit 405 is a circuit for determining whether or not the pixel values in the area in the (2×2) pixels are almost the same as one another. The output pixel from the 1H memory 402 and the output pixel from the 1H memory 401 are used as the input to the detection circuit 406.

The (2×2) detection circuits 405, 406 may obtain the outputs of information determining that the pixel values in the area of the (2×2) pixels are almost the same as one another in an encircled area of FIG. 5B. This determination result and the pixel values are input to a characteristic detection circuit 407.

The characteristic detection circuit 407 generates a control signal for the data rate conversion module 15. The control signal includes a control signal for rate conversion, and a control signal for resolution adjustment. The detection circuit 407 will be described further specifically and circumstantially hereinafter.

Figure 10A:
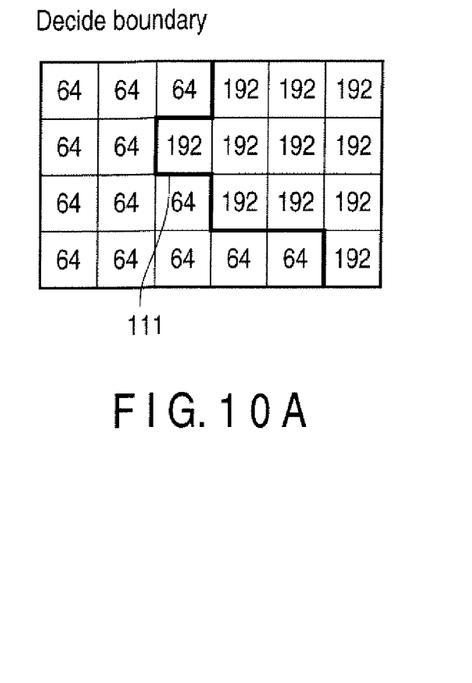
FIGS. 10A-10D are respective explanation views of the luminance signal block, the virtual color-difference block, and color-difference signal block for explaining operations of the conversion device of FIG. 9.

That is, the detection circuit 407 firstly decides the luminance boundary 111 in the luminance signal block, as shown in FIG. 10A. Thereby, a plurality of areas which have been divided by the luminance boundary 111 are decided. Next, in each area, the detection circuit 407 identifies pixel values to be employed and pixel values not be employed. As regards the pixel values to be employed, if it is determined that the values of four pixels are almost the same as one another (encircled part in FIG. 10B) by the determination from the (2×2) detection circuits 405, 406, it is determined that the pixel values in the same area of the determined pixels may be employed. In other words, with reference to the example of FIG. 10B, the encircled part in the area A employs the value 64, and the encircled part in the area B employs the value 192.

Figure 10B:
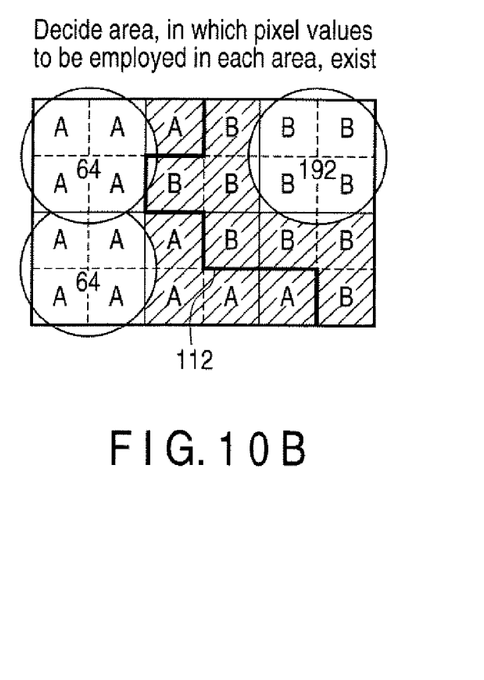
Figure 10C:
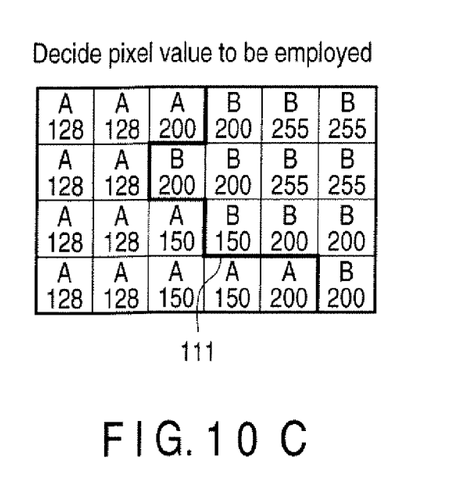

Thus, the information on the luminance boundary line in FIG. 10B and the information on the area to be employed is input to the virtual color-difference signal block in FIG. 10C. Thereby, the virtual color-difference signal block becomes a control signal so as to employ the value 128 in the area A and the value 255 in the area B among the pixel values shown in FIG. 10C.

Figure 10D:
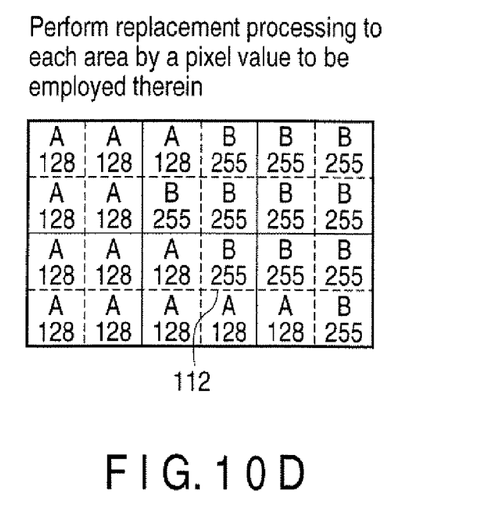

While being applied with rate conversion, the actual color-difference signal block is written into the data rate conversion module 15. Resolution conversion is applied on the basis of the control signal from the characteristic detection circuit 407. Thereby, as shown in FIG. 10D, a color-difference signal block of which the resolution has been converted may be obtained.

Figure 11:
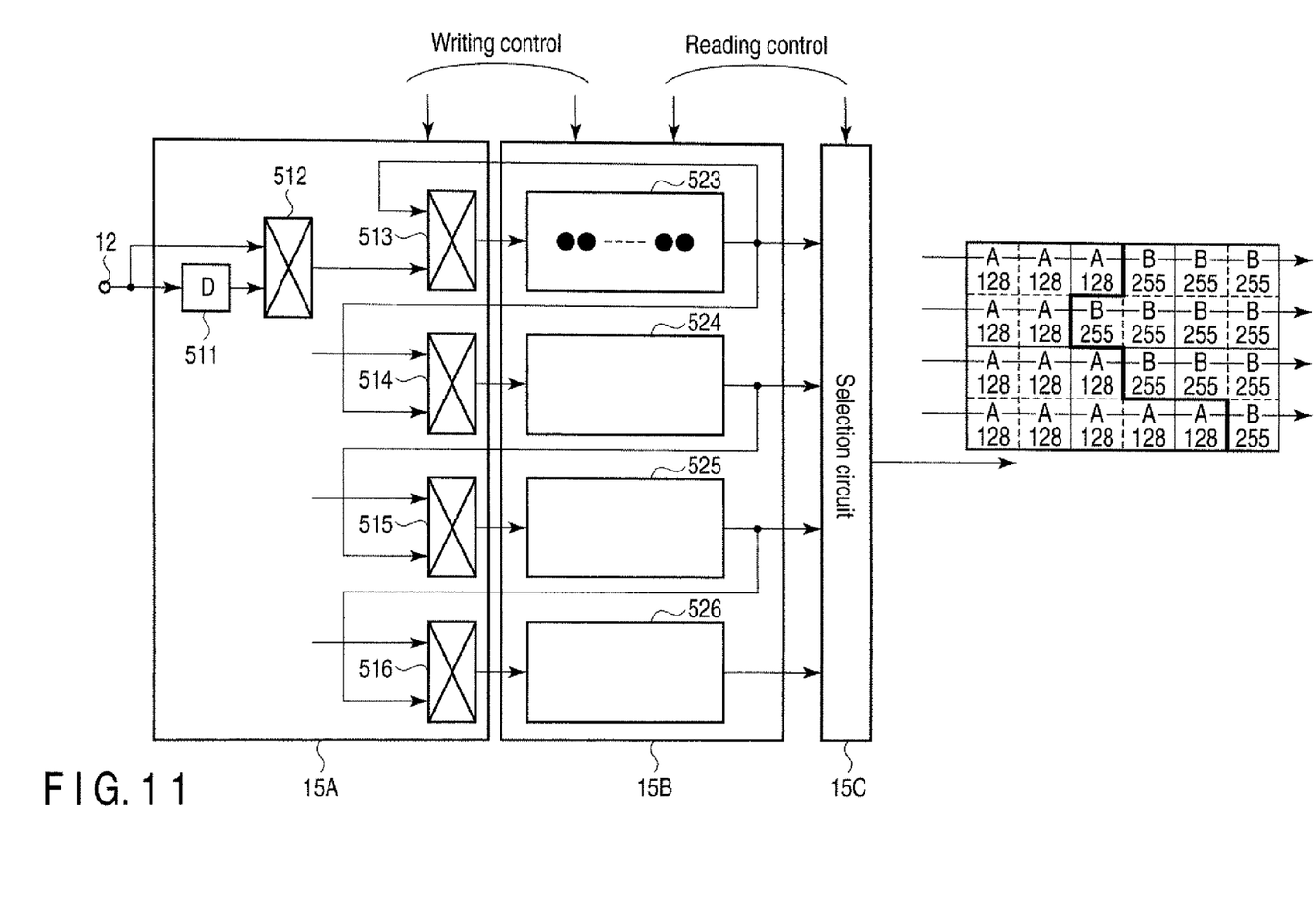
FIG. 11 is a view depicting a configuration example of a data rate conversion module of FIG. 9.

FIG. 11 shows an example of the data rate conversion module 15. The pixel data of the color-difference signal to be input to the input terminal 12 is written into the data rate conversion module 15. Writing control for this writing is performed on the basis of a writing and copy control signal from the detection circuit 407. This writing is implemented while the luminance signal block is written into the 1H memories 401, 402, 403. Then, the data rate conversion module 15 stands by so as to start characteristic detection.

The pixel data at the input terminal 12 is input to any one of a one-clock delay module 511 and a selector 512. The selector 512 alternatively selects the pixel data from the input terminal 12 and the pixel data from the one clock delay module 511 to supply the pixel data to a selector 513. Thereby, a data rate in a horizontal direction of the color-difference signal is doubled. The pixel data selected by the selector 513 in a first horizontal period is input to a first memory module 523 of a random access memory (RAM) 15B. In the next second horizontal period, the pixel data of the first memory module 523 is transferred to a second memory module 524 via a selector 514. The pixel data of the first memory module 523 is fed back to be written again in the first memory module 523 via the selector 513. Thereby, the data rate in a vertical direction of the pixel data of one line is doubled.

In a third horizontal period, the pixel data in the second memory module 524 is transferred to a third memory module 525 via a selector 515. At this moment, the pixel data of the next line of the color-difference signal is written into the first memory module 523. In a fourth horizontal period, the pixel data in the third memory module 525 is transferred to a fourth memory module 526 via a selector 516, and the pixel data in the second memory module 524 is transferred to a fourth memory module 526 via a selector 515. The pixel data in the first memory module 523 is transferred to the second memory module 524 via the selector 514. The pixel data in the first memory module 523 is fed back to be written again into the first memory module 523 via the selector 513. Thereby, the pixel data shown in FIG. 10c is stored in the RAM 15B.

Then, the pixel data on the RAM 15B is read on the basis of a reading control signal. The items of pixel data from memory modules 523-526 are supplied to a selection circuit 15C. The selection circuit 15C selects to output the pixel data of the employed pixel values. In the area A, the pixel data of the pixel value 128 is read, and in the area B, the pixel data of the pixel value 255 is read. A clock for setting read timing and a reading address are supplied from the detection circuit 407. As for the read address, identical addresses may be used a plurality of times. This use is actualized by the control signals based on the virtual color-difference signal blocks which have been described for FIGS. 10B and 10C.

The detection circuit 407 may also perform through processing for only applying the rate conversion to the pixel as it is and for outputting the converted pixel. If the detection circuit 407 performs only the data rate conversion of the pixel data and does not perform replacement processing of the pixel values, it is sufficient to read the pixel data on the RAM 15B in turn by the reading control. Thereby, the pixel data of the color-difference signal, of which the rates in horizontal and vertical directions are doubled, can be obtained.

Figure 12:
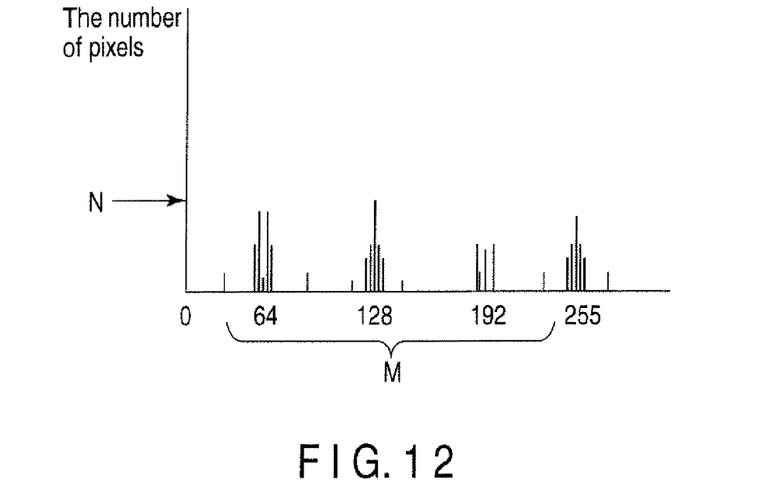
FIG. 12 is a view depicting another example of the histogram.

The through processing is executed when the detection circuit 407 has recognized, for example, a histogram, as is shown in FIG. 12.

The histogram shown in FIG. 12 may be obtained in a case where an image is captured from a natural landscape and in a case where pixels of various values are distributed. In this case, to apply pixel replacement processing to the color-difference signal, the color of the image may be disturbed. In such a case, it may be preferable to convert only a data rate of an input color-difference signal to output the converted color-difference signal for certain pictures. The pixel conversion device is configured so as to cope with the situation mentioned above. If the peak value in the histogram information is lower than a prescribed value N, the detection circuit 407 outputs a control signal so that the data rate conversion module 15 converts only the data rate of the color-difference signal block to output the converted color-difference signal block.

If the number of the peak values in the histogram information is larger than a prescribed number M, the detection circuit 407 outputs the control signal so that the data rate conversion module 15 outputs the color-difference signal by converting only the data rate of the color-difference signal.

The detection circuit 407 may forcibly output the control signal so that the data rate conversion module 15 outputs the color-difference signal by converting only the data rate of the color-difference signal through an external operation. In other words, the detection circuit 407 may forcibly set whether the resolution adjustment of the color-difference signal should be performed or not through the external operation.

Figure 13:
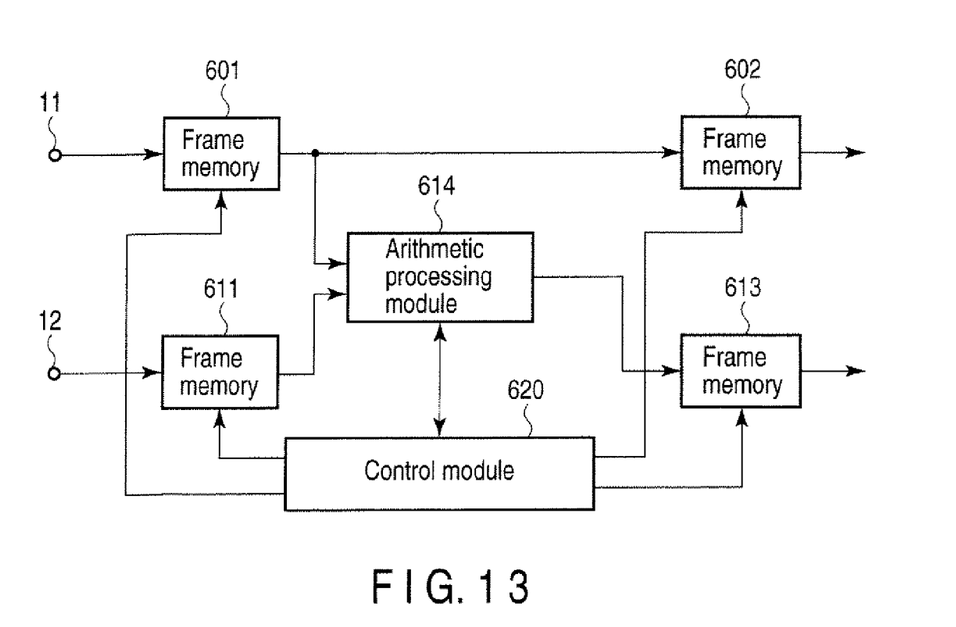
FIG. 13 is a view depicting a further example of the conversion device of the invention.

The pixel conversion device of the invention is not limited to the above embodiment. While the foregoing embodiment mainly performs processing by means of hardware, the conversion device may be configured, as is shown in FIG. 13, so that the processing related to the invention may be performed through software.

In other words, the input terminal 11, to which the digital luminance signal is input, is connected to a frame memory 601. The input terminal 12 to which the digital color-difference signal is input is connected to a frame memory 611. The output from the frame memory 601 is supplied to the arithmetic processing module 614 and a frame memory 602 for time adjustment. The output from the frame memory 611 is supplied to the arithmetic processing module 614. The arithmetic processing module 614 performs data rate conversion of the color-difference signal and improves the color quality. The pixel data of the color-difference block obtained by the processing module 614 is input to a frame memory 613 to be read in synchrony with the pixel data of the corresponding-luminance signal block.

Operations of the frame memories 601, 602, 611, 613, and the processing module 614 are controlled on the basis of timing pulses and control signals from a control module 620.

Figure 14:
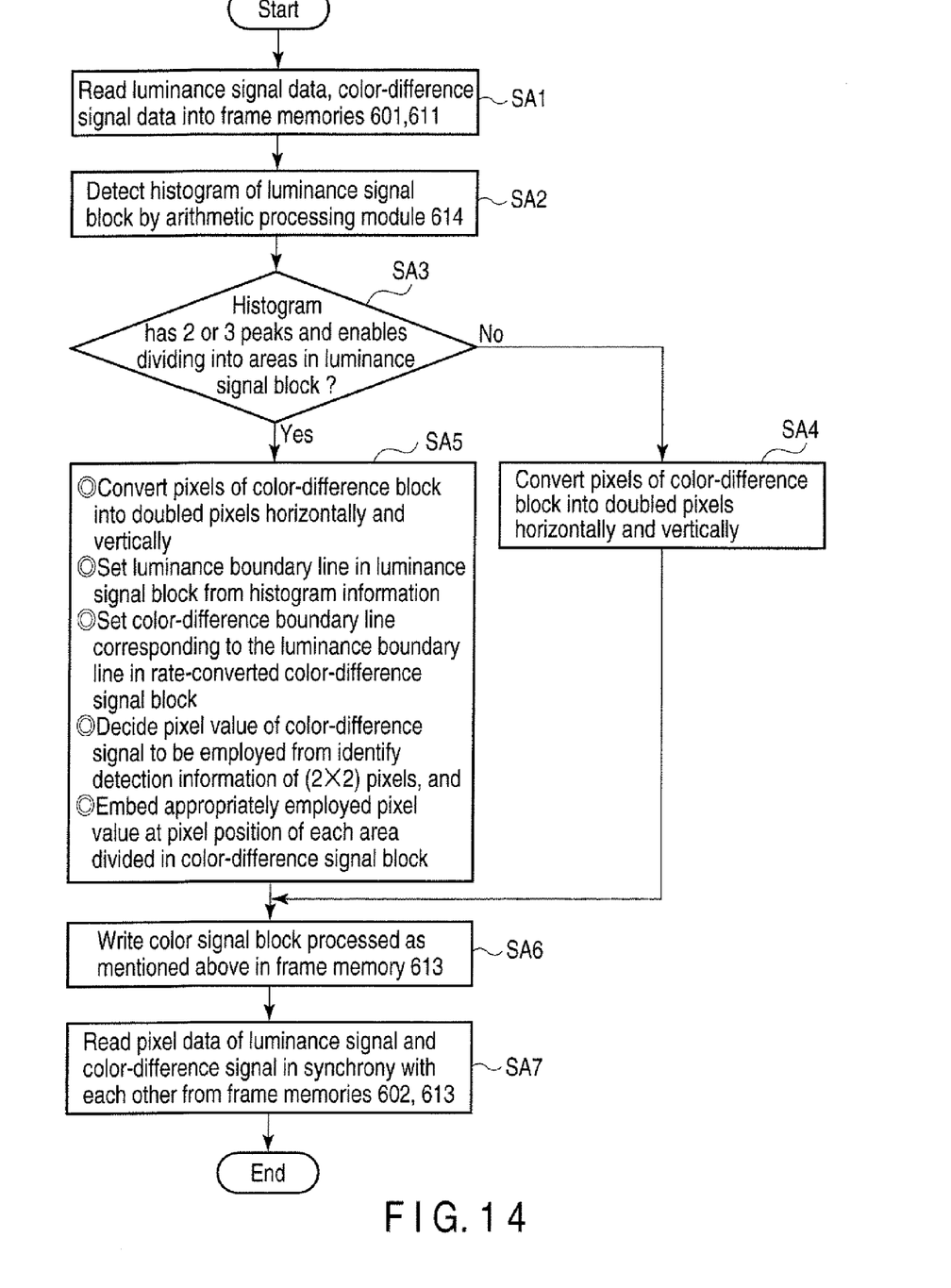
FIG. 14 is a flowchart for explaining operations of the conversion device of FIG. 13.

FIG. 14 shows a flowchart illustrating operations of the above device. Luminance signal data and color signal data are read into frame memories 601, 602, respectively (Step SA1). The arithmetic processing module 614 detects the histogram of the luminance signal block (Step SA2). Then, it is determined whether or not the histogram has two or three peaks, and enables dividing the luminance signal block into areas (Step SA3). If a decision of "NO" is made, the pixels in the color-difference signal block are converted into double data rates in both the horizontal and the vertical directions (Step SA4).

If a decision of "YES" is made in Step SA3, the processing is conducted in Step SA5 as follows:

Convert the pixels of the color-difference signal block into double data rates in both the horizontal and the vertical directions Set the luminance boundary line within the luminance signal block from histogram information Set the luminance boundary line, as the color-difference boundary line, within the color-difference signal block of the double data rates Decide a pixel value of the color-difference signal to be employed as a representative for each area from identity detection information of the (2×2) pixels.

Unify the pixel value of each area to the pixel value which is representative of the pixel value of each area in the color-difference signal block of which the data rate is converted into the double data rate.

After the aforementioned processing, the color-difference block of which the data rate has been converted and the resolution has been converted is written into the frame memory 613, and then, the luminance signal in the frame memory 602 and the color-difference signal in the frame memory 613 are read in synchrony with each other.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A pixel conversion device which converts a first digital image signal in a format of 4:2:0 including a digital luminance signal and a digital color-difference signal before conversion into a second digital image signal in a format of 4:4:4 including digital luminance signal and a digital color-difference signal after conversion, comprising:
   a histogram extraction module configured to extract a histogram in a luminance signal block, which is a processing module of the digital luminance signal, before conversion;
   a data rate conversion module configured to convert a color-difference signal block of the digital color-difference signal before conversion into a color-difference signal for the format of 4:4:4 on basis of a control signal, the color-difference signal for the format of 4:4:4 corresponding to a virtual color-difference signal block which is the same data rate as that of the luminance signal block; and
   a picture characteristic extraction module configured to detect a luminance boundary in the luminance signal block on basis of information on the extracted histogram, sets a color-difference boundary of the same pattern as that of the luminance boundary to the virtual color-difference signal block to divide the virtual color-difference signal block into each area, and generates the control signal for unifying the same area by pixel data of the same value, the picture characteristic extraction module further outputting the control signal so that the data rate conversion module converts a data rate of the color-difference signal block to output the converted color-difference signal block without unifying the same area by pixel data of the same value when the number of peak values in the histogram information is smaller than a prescribed number, or when the number of peak values in the histogram information is larger than a prescribed number.

2. The pixel conversion device according to claim 1, wherein:
   the picture characteristic extraction module is configured to respond to an outer operation and switchover between output of the control signal so that the data rate conversion module converts only a data rate of the color-difference signal block, and output of the control signal so that the data rate conversion module converts the data rate and corrects the resolution of the color-difference signal block by unifying the same area by pixel data of the same value.

3. A pixel conversion method which converts a first digital image signal in a format of 4:2:0 including a digital luminance signal and a digital color difference signal before conversion into a second digital image signal in a format of 4:4:4 including digital luminance signal and a digital color difference signal after conversion, comprising:
   detecting a histogram in the luminance signal block by a histogram extraction module;
   converting a color-difference signal block of the digital color-difference signal before conversion into a color-difference signal for the format of 4:4:4 on basis of a control signal, the color-difference signal for the format of 4:4:4 corresponding to a virtual color-difference signal block which is the same data rate as that of the luminance signal block, by a data rate conversion module; and
   detecting a luminance boundary in the luminance signal block on basis of information on the extracted histogram, setting a color-difference boundary of the same pattern as that of the luminance boundary to the virtual color-difference signal block to divide the virtual color-difference signal block into each area, and to generate the control signal for unifying the same area by pixel data of the same value, further outputting the control signal so that the data rate conversion module converts a data rate of the color-difference signal block to output the converted color-difference signal block without unifying the same area by pixel data of the same value when the number of peak values in the histogram information is smaller than a prescribed number, or when the number of peak values in the histogram information is larger than a prescribed number.

4. A pixel conversion method which converts a first digital image signal in a format of 4:2:0 including a digital luminance signal and a digital color difference signal before conversion into a second digital image signal in a format of 4:4:4 including digital luminance signal and a digital color difference signal after conversion, comprising:
   writing the digital luminance signal before conversion and the digital color-difference signal before conversion into first and second frame memories;
   reading the digital luminance signal before conversion and the digital color-difference signal before conversion from the first and the second frame memories by an arithmetic processing module;
   extracting a histogram in a luminance signal block which is a processing unit;
   detecting a luminance boundary in the luminance signal block on the basis of information on the extracted histogram; and
   converting a color-difference signal block of the digital color-difference signal before conversion into the virtual color-difference signal block which is the same data rate as that of the luminance signal block, setting a color-difference boundary in the same pattern as that of the luminance boundary to divide the virtual color-difference signal block into each area, correcting resolution by unifying the same area with pixel data of the same value, and no-unifying the same area with pixel data of the same value when the number of peak values in the histogram information is smaller than a prescribed number, or when the number of peak values in the histogram information is larger than a prescribed number, and obtaining a color-difference signal for the format of 4:4:4.

* * * * *